(12) United States Patent
Porter et al.

(10) Patent No.: US 9,013,116 B2
(45) Date of Patent: Apr. 21, 2015

(54) LIGHT SOURCE, PULSE CONTROLLER AND METHOD FOR PROGRAMMABALE PULSE GENERATION AND SYNCHRONIZATION OF LIGHT EMITTING DEVICES

(75) Inventors: Thomas Blair Porter, Toronto (CA); Stewart Andrew Clark, Toronto (CA)

(73) Assignee: Excelitas Canada, Inc., Vaudreuil-Dorion (CA)

( * ) Notice: Subject to any disclaimer, the term of this patent is extended or adjusted under 35 U.S.C. 154(b) by 38 days.

(21) Appl. No.: 14/117,311

(22) PCT Filed: May 10, 2012

(86) PCT No.: PCT/CA2012/000446
§ 371 (c)(1),
(2), (4) Date: Jan. 15, 2014

(87) PCT Pub. No.: WO2012/151678
PCT Pub. Date: Nov. 15, 2012

(65) Prior Publication Data
US 2014/0184089 A1    Jul. 3, 2014

Related U.S. Application Data

(60) Provisional application No. 61/485,471, filed on May 12, 2011.

(51) Int. Cl.
*H05B 37/02* (2006.01)
*H05B 33/08* (2006.01)
*G01J 3/10* (2006.01)

(52) U.S. Cl.
CPC ............... *H05B 33/0815* (2013.01); *G01J 3/10* (2013.01); *H05B 33/086* (2013.01); *Y02B 20/346* (2013.01)

(58) Field of Classification Search
CPC ........... H05B 33/0815; H05B 33/0842; H05B 33/086; H05B 33/0818; H05B 33/0863; H05B 33/0881; Y02B 20/42; Y02B 20/346
USPC ......... 315/294, 297, 307, 291, 312, 318, 360; 700/11, 14, 17, 20
See application file for complete search history.

(56) References Cited

U.S. PATENT DOCUMENTS

| 7,891,853 | B2 * | 2/2011 | Park ............................... 362/611 |
| 2006/0237636 | A1 * | 10/2006 | Lyons et al. .................. 250/228 |
| 2008/0290292 | A1 | 11/2008 | Squirrell et al. |
| 2009/0156429 | A1 | 6/2009 | Scott et al. |
| 2011/0018465 | A1 * | 1/2011 | Ashdown ....................... 315/294 |
| 2011/0089341 | A1 | 4/2011 | Aasmul et al. |

* cited by examiner

*Primary Examiner* — Haiss Philogene
(74) *Attorney, Agent, or Firm* — Peter A. Nieves; Sheehan Phinney Bass + Green PA

(57) ABSTRACT

An LED (Light Emitting Device) light source (100), a pulse controller or pulse control module (130) for an LED light source, and a method are provided, for controlling relative timing and phase of LED light pulse generation and operation of peripheral devices, relative to a common timing reference. A system is provided comprising a pulse controller (130) for controlling synchronization of multiple LEDs (144) and/or other devices and peripherals (164), relative to a common timing reference. The pulse controller (130) comprises a processor (131) that programmatically executes a time based sequence of digital control signals (141) from received inputs (121) indicative of a pulse generation sequence. The pulse controller provides for multiple pulse trains where improved control of relative timing of several events is required, such as for control of multiple high intensity LED light sources and synchronized control of peripheral devices such as detectors, for applications, such as, fluorescence microscopy and other spectroscopic applications.

35 Claims, 12 Drawing Sheets

LIGHT SOURCE, PULSE CONTROLLER AND METHOD FOR PROGRAMMABALE PULSE GENERATION AND SYNCHRONIZATION OF LIGHT EMITTING DEVICES

CROSS-REFERENCE TO RELATED APPLICATIONS

This application is a national entry of PCT International application no. PCT/CA2012/000446, designating the United States, having an international filing date of May 10, 2012, and claiming priority from U.S. provisional patent application No. 61/485,471, filed May 12, 2011.

TECHNICAL FIELD

This invention relates to systems and methods for controlling light sources comprising solid-state Light Emitting Devices (LEDs) and particularly relates to pulse controllers for high intensity LED light sources, for applications such as fluorescence microscopy, requiring control of the timing and synchronization of one or more light pulses.

BACKGROUND

Solid-state Light Emitting Devices (LEDs), such as light emitting diodes or solid state lasers, are now commercially available with increasingly higher power density in the visible and near ultraviolet (UV) spectrum. Some of these LEDs, and particularly high brightness UV and visible light emitting diodes, now have demonstrated capability for supplanting high power lamps (e.g. mercury lamps) and conventional laser-based systems, as light sources for fluorescence microscopy and other spectroscopic applications. LED light sources are relatively compact, are electronically controllable, can be modulated to provide pulsed operation and potentially have advantages with respect to cost and relatively long lifetime.

In a typical fluorescence microscopy application, for example, for biomedical diagnostics, a biological sample comprising a fluorophore is illuminated with light of a known wavelength, and the resulting fluorescence is observed using a CCD camera. While it used to be sufficient to illuminate and capture fluorescence in a qualitative manner, an increasing drive towards quantitative analysis has necessitated more accurate control over experimental conditions and parameters. In some systems, the illumination system may comprise several LED light sources, each producing light of a different wavelength or colour, coupled to the microscope system for pulsed excitation of fluorescence from a biological sample. Existing LED illumination systems provide only limited flexibility to control light pulses, or pulse trains from multiple LEDs and/or to synchronize with external devices, such as radiometers, detectors, cameras or other microscope peripherals.

For example, in some applications, during an experiment it may be desirable to expose cells to a light pulse of controlled duration and intensity to minimize photo-bleaching of cells. To that end, specific and precise control of the light source pulses is required together with triggering of external devices, in advance of, or delayed, relative to turning on or off of the light source. Typically, tight and flexible control of the LED light source in a time range from a few microseconds to many hours may be required, with adjustability in the microsecond, millisecond or second ranges.

Thus, a typical fluorescence microscopy experiment may require the following generic procedure to be followed:

Activate LED(s) of a selected wavelength(s) to predetermined intensity level(s),
Acquire an image frame from a digital camera,
Deactivate LED(s),
Repeat sequence if necessary.

The complexity of the experiment may vary, for example, depending on the number of LEDs being turned on/off, the acquisition time of a peripheral device, such as a CCD camera, the sequencing of the various LEDs, the equipment synchronization, the repetition rate, as well other parameters and controls.

The requirement for triggering stems from the need to align events in time between multiple physical elements in a system. That is, a detector or CCD camera, for example, may need to be triggered to start acquiring data at a specific time relative to when the experiment was started.

Many known LED sources allow for external pulse generating equipment to be connected to the LED light source for automation of LED activation/deactivation during a fluorescence experiment. However, such equipment typically requires BNC cable connectivity for each LED and a minimum of 1 external pulse generator on the bench. A separate signal must be sent to trigger the camera exposure. This may either be derived from the pulse itself or from the signal generator trigger output. In situations where there are different pulse lengths and repetition rates on each LED, there would be a requirement for individual pulse generators and associated cabling for each unique pulse signature being used.

The ability to generate pulses internally would remove the need for external pulse generators, external trigger derivation and associated cabling complexity. However, existing LED light sources do not provide individual pulse control for multiple LEDs. One commercially available system operates in either internal pulse generation mode or external pulse generation mode. Such a limitation means that the system is either pulsed externally or relies on the internal generator. Although individual LEDs can be turned on or off, the consequence of this is that the pulses are phase aligned, copied across all the LEDs. Significant additional hardware, including an additional external pulse generator, is required for fluorescence experiments where there is a requirement for the LEDs to be activated and deactivated in sequences which are markedly out of phase and/or with different pulse characteristics.

For example, referring to FIG. 1 (Prior Art), which illustrates light pulse sequences when a single internal or external pulse generator is used to control multiple LEDs, e.g. LED1 and LED2, all LEDs in the system will be on or off at the same time and with the same duty cycle. There is only one trigger indicating when all LEDs should turn on and off. There is no independent channel adjustment. Referring to FIG. 2 (Prior Art) illustrating light pulse sequences obtained by using multiple pulse generators to provide independent control of LEDs, each LED can have a unique on/off time. However, the delay or phase shift between the first and second pulse trains is difficult to control.

The lack of integrated pulse control functionality in known system results in significant additional equipment cost for external pulse generators and control equipment, and resultant associated bench space and cabling requirements. Even for skilled users, such an arrangement also results in significant experimental set-up time and complexity for experiments requiring control of light pulse characteristics and relative phase for multiple LEDs. A lower cost system and simpler set-up and operation would be desirable.

Thus, there is a need for improved systems, methods and devices for control of pulse generation and synchronization of LED light sources, for applications such as fluorescence microscopy.

SUMMARY OF INVENTION

The present invention seeks to eliminate or mitigate, the above-mentioned problems with known LED control systems and methods, or at least provide an alternative.

A first aspect of the invention provides an LED light source comprising: an LED module (140) comprising one or more LEDs (142) and respective LED drivers (144), a control means (120), and a pulse controller means (130) for controlling pulse generation, wherein: the pulse controller means comprising processor means (130) for receiving inputs (121) indicative of a pulse generation sequence and generating control signals for each of a plurality of devices comprising the one or more LEDs and/or other (peripheral) devices, and for independently controlling, with respect to a common timing reference, timing and relative phase of pulsed operation of the one or more LEDs and/or one or more other devices (160).

Beneficially, the processor means (130) is operable to execute a time based sequence of control signals comprising digital outputs for independently controlling timing and relative phase of a change in operational state of one or more of the plurality of devices, said digital outputs comprising, for each of the plurality of devices, a respective LED output or trigger output. For each change in operational state, said digital outputs comprise one or more of LED on, LED off, trigger on and trigger off outputs.

The processor means (130) may further comprise: interface means (136) for receiving from the control means (120) inputs indicative of a pulse generation sequence (121) defining transition events associated with a change of operational state for one or more of the plurality of devices, said inputs comprising the timing of each transition event with respect to the common timing reference, and for each transition event, the corresponding operational state for each device; data storage means (134) for storing the inputs indicative of a pulse generation sequence; timer means (132) for timing of transition events with respect to the common timing reference; and digital output means (138) for generating a timed based sequence of said control signals comprising digital outputs for each transition event.

For each transition event, digital outputs comprise one or more of LED on, LED off, trigger on and trigger off outputs for controlling the operational state of each of the plurality of devices. The timer means (132) defines the common reference timing for the plurality of devices and may further comprises counter means for counting time units. The storage means (134/136) stores inputs indicative of a pulse generation sequence for the time based sequence comprising: timing values in timing units, relative to said common reference timing, for each transition event; and corresponding port output values for setting the operational state of each of said plurality of devices at each transition event. The processor means is operable from the time based sequence to set initial output port values and to run the counter means to count timing units to a transition event, retrieve corresponding output port values, and provide corresponding digital outputs comprising port output values for each device for each transition event.

A second aspect of the invention provides a pulse controller for an LED light source (100) comprising processor means (130) for receiving inputs (121) indicative of a pulse generation sequence and generating control signals for each of a plurality of channels (131/161) for independently controlling, with respect to a common timing reference, timing and relative phase of pulsed operation of a plurality of devices (140 and/or 160) comprising one or more LEDs (140) and one or more other devices or peripherals (160).

Another aspect of the invention comprises a method for controlling operation of an LED light source comprising one or more LEDs and respective LED drivers, a control means and a pulse controller means for controlling pulse generation, the method comprising: receiving, from input means, inputs indicative of a pulse generation sequence for each of a plurality of devices comprising the one or more LEDs and optionally for one or more other devices; generating, in the pulse controller means, digital control signals for each of a plurality of channels (131/161), each associated with a respective one of said one or more LEDs and one or more peripheral devices; said digital control signals independently controlling, with respect to a common timing reference, timing and relative phase of pulsed operation of the plurality of devices (140 and/or 160) comprising one or more LEDs (140) and one or more other devices (160).

Yet another aspect of the invention provides a system comprising a pulse controller for controlling pulse generation and synchronization of multiple LEDs and optionally one or more peripheral devices, wherein the pulse controller comprises processor means for carrying out a method as claimed herein.

An additional aspect of the invention provides fluorescence microscopy system comprising an LED light source comprising an integrated pulse control module as claimed herein, for executing a time based sequence of digital outputs for independently controlling timing and relative phase of one or more LED light pulses and synchronization with peripheral devices of the fluorescence microscopy system.

For example, a pulse controller or pulse control module may provide digital outputs for controlling 8 channels, e.g. for 4 LEDs and 4 respective/corresponding triggers for peripheral devices. The method comprises executing an output control sequence to generate 8 respective digital outputs in a coordinated sequence. Based on a common timing reference, timing pulses may be generated with respect to each other to enable a sequence of events to be controlled independently on each channel. Each output signal or channel can be programmed independently or dependently with respect to a single timing reference. The pulse train for each channel can be independent, and the method may comprise generating pulses in any sequence on any channel and/or without having to change output channels.

In a preferred embodiment, the pulse controller takes the form of a pulse control module that, preferably, is integrated in the light source unit, and may for example, comprise a processor chip, a FPGA, CPLD, ASIC, or other digital processor device or circuit for implementing a method as described herein, i.e. for programmatically executing the time based sequence of digital control signals from received input pulse parameters.

Conveniently, the light source comprises a user interface, preferably a touch screen graphical user interface, to facilitate input of pulse parameters for each channel, and to allow for viewing of pulse parameters in a virtual oscilloscope mode, for example.

Thus, operation of one or more LED light sources is triggered by, and timed relative to, a common timing reference or a single initial event, and based on a single time based parameter that generates a series of digital outputs, which may be executed like a program. All LEDs can be set up independently with different pulse trains, while the timing between internal LEDS and external devices is related back to a single (i.e. common) time source initiated by a common start event.

The LED light source may comprise a plurality of LEDs emitting different wavelengths or colours, which may be independently actuated.

In a preferred embodiment, control outputs are generated in pairs for each LED and a corresponding external trigger, and comprise a phase difference defined by a respective sync. out timing parameter.

By selecting a global trigger option, all outputs may be tied to one input trigger. This reduces the number of cable inputs required if the LEDs are always to be triggered at the same time. This may be implemented with a software setting and it can be deactivated for any channel, thus allowing the isolated channel to operate in a separate trigger domain, if necessary.

Thus, the system allows for each LED pulse controller to be linked to a trigger output that can be used to synchronize external equipment. When signals are generated internally, i.e., by an integrated pulse control module within the light source unit, there also exists the possibility of "phasing" a trigger channel output relative to the LED control output. That is, in a situation where a piece of external equipment takes a long time to initialize before being ready to use, it is possible to sequence its startup prior to the LED being activated by using the LED pulse information and "looking ahead" a predetermined time in the sequence.

The system is capable of doing this on a per-LED basis, so for a 4 LED system, there may be four such outputs that can either be advanced or retarded in time to suit. Even in repetitive pulse trains, the advance and retard time is not limited to a single cycle.

A preferred implementation of the system comprises 8 channels, and ties 4 channels to the LEDs and 4 to the trigger outputs for other devices, e.g. peripherals such as detectors or other external equipment. Each LED channel is paired with a trigger output channel and the trigger output may be a time advanced or retarded version of the LED pulse train. The LED-trigger pairing may be broken or be otherwise arranged, releasing the trigger from echoing the LED pulse train. This option allows the unit to behave as though it had four separate, programmable TTL-level pulse generators that could be used to either drive equipment in another part of the experiment or for a completely isolated experiment entirely. In the same vein, since the pulse train is established in memory as a series of transition events, it is possible for each LED to be configured to have an arbitrary pulse sequence assigned to it.

The ability to establish different trigger domains and different pulse sequences over extended or very long time periods means that much of the sequencing complexity that is currently executed in high-level software applications in existing sequences is migrated down to a single-purpose piece of hardware. With PC application software being vulnerable to timing instability, security problems, operating system stability, for example, the migration of this sequencing to hardware aids in the experimental resiliency of the setup.

Each LED may operate independently with regard to the sourcing of the signal pulse. In so much as the LED can be set to pulse from its own internal generator, it can also be individually set to use an external source.

Channels may be individually configured as internally or externally, and triggered on a per-LED basis. This has the advantage of being able to support applications where there is no known relationship between some of the inputs. For example, two of the channels may be running from triggers that are generated on the pulse control module internally where an asynchronous event is controlling other LEDs.

Another aspect of the invention provides a fluorescence microscopy system comprising an LED light source comprising an integrated pulse control module, as described above, for executing a time based sequence of digital outputs for independently controlling timing and relative phase of one or more LED light pulses and synchronization with peripheral devices.

LED light sources may comprise light emitting diodes or other semiconductor light emitting devices, including laser diodes, or other electroluminescent devices, emitting light of a required wavelength.

Thus LED light sources, pulse control modules, systems and methods according to embodiments of the present invention provide integrated functionality for internal pulse synthesis with improved control of single pulses or pulse trains from multiple LEDs, including multiple trigger domains, trigger phase adjust and external synchronization, for applications such as fluorescence microscopy.

Preferred embodiments comprise a touch screen graphical user interface for the controller which, advantageously, allows an operator to more readily set up experiments and modify parameters by offering an interface ("trigger screen") for selecting a specific operating wavelength and parameters such as delay time, on time, off time and sync.out timing for each channel. Another interface or LED screen may provide a virtual oscilloscope view to enable pulse sequences or pulse trains for each channel to be visualized—e.g. for each of the 4 LED/external trigger pairs.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

DESCRIPTION OF PREFERRED EMBODIMENTS

Figure 1:
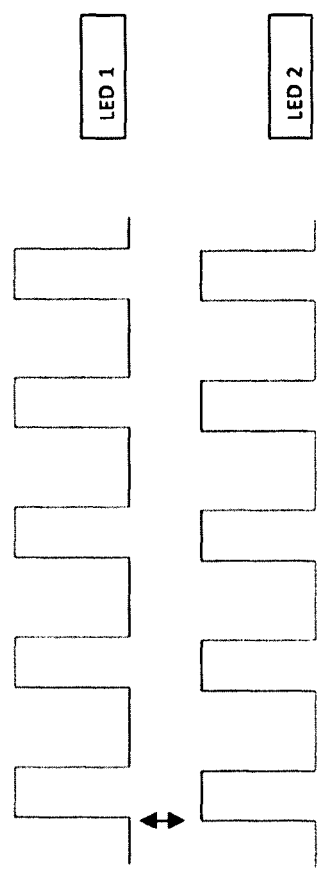
FIG. 1 (Prior Art) illustrates schematically pulse trains when a single internal or external pulse generator is used to control multiple LEDs (LED1, LED2)
Figure 2:
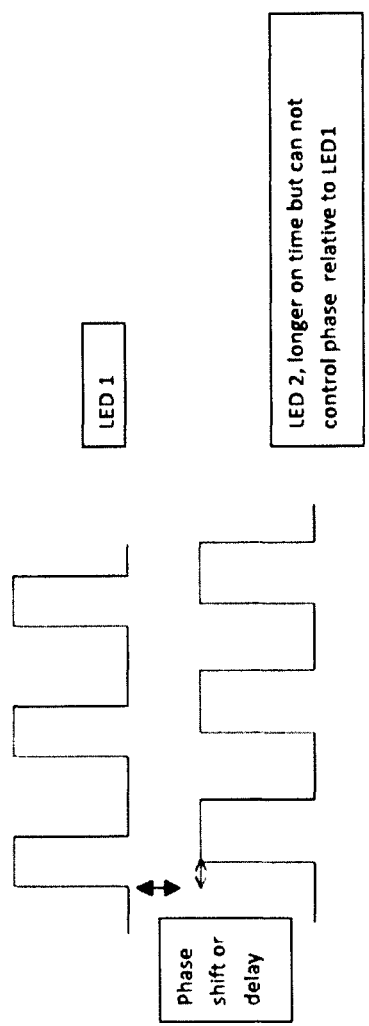
FIG. 2 (Prior Art) illustrates schematically pulse trains for multiple LEDs (LED1, LED2) using separate pulse generators for independent control of LEDs.
Figure 3:
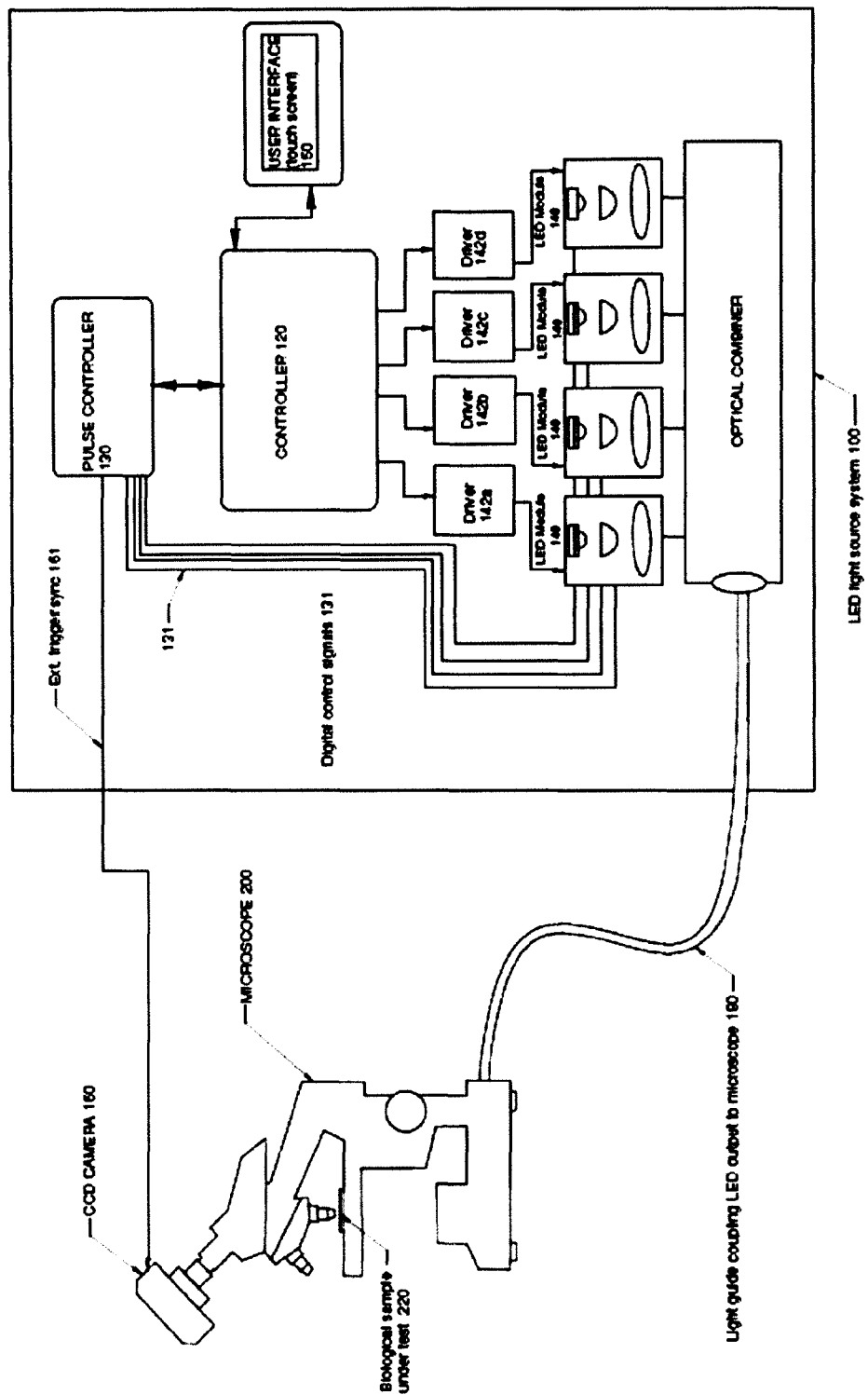
FIG. 3 shows a schematic block diagram of apparatus for fluorescence microscopy, having an LED light source comprising an LED module, a control module and a pulse control module according to a first embodiment of the present invention.

A schematic view of apparatus for fluorescence microscopy 10, comprising an LED light source 100 having an integrated pulse controller, i.e. pulse control module 130, according to a first embodiment of the present invention is shown in FIG. 3. The light source 100 also comprises an LED module 140 and a control module 120.

Referring to FIG. 3, illumination from the LED module 140 is optically coupled to a microscope 200 by a light guide 180 for illuminating a biological sample under test 220. An imaging system, i.e. a CCD camera 160 is coupled to the microscope 200. The light source 100 comprising the LED module 140, controller 120, pulse controller 130 and user interface 150 will be described in more detail below with reference to FIG. 4, which shows schematically a block diagram illustrating more details of these components and their interconnections.

Figure 4:
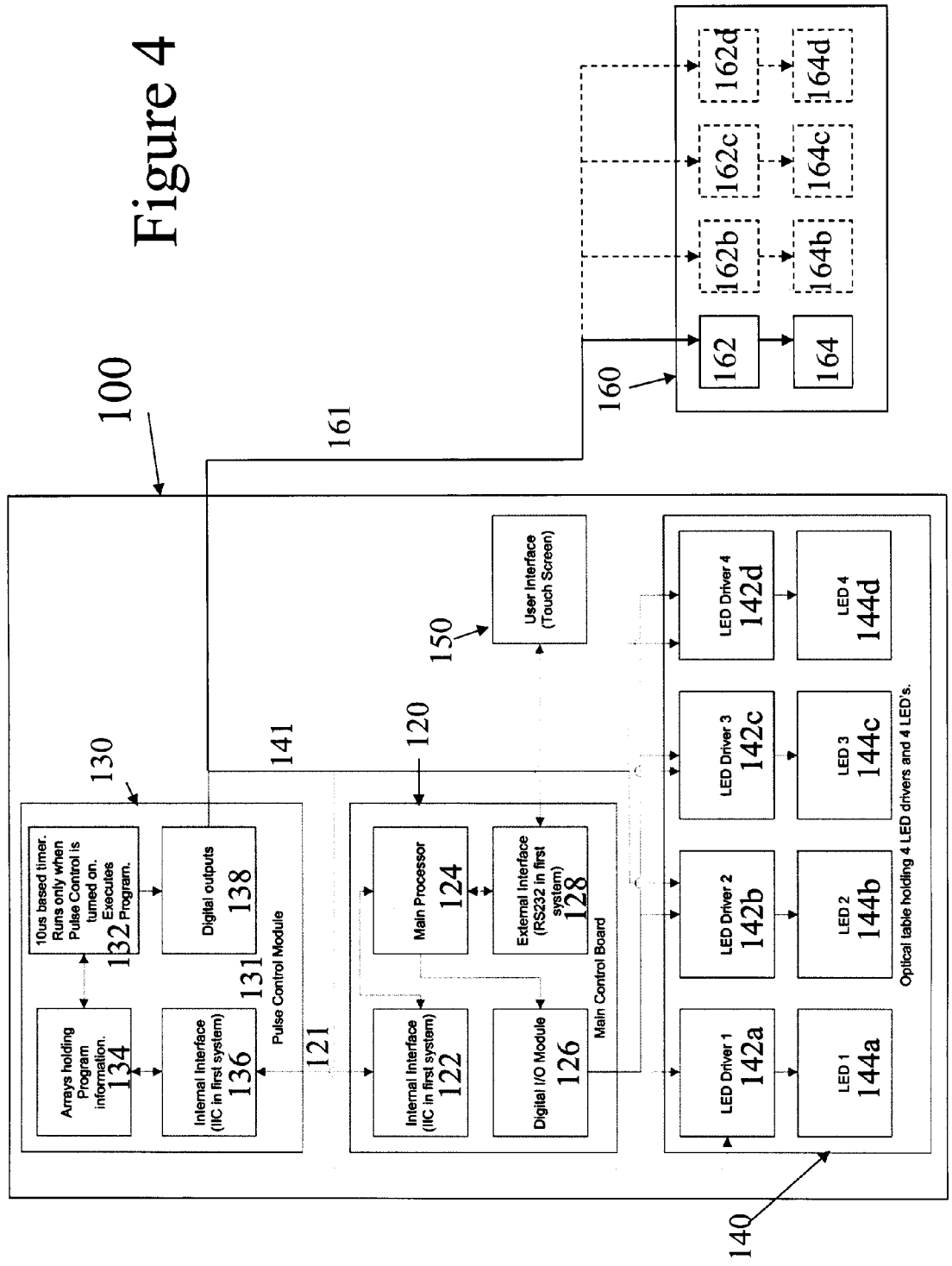
FIG. 4 shows a block diagram of part of the system showing more details of the LED module, control module and pulse control module illustrated in FIG. 3.

Referring to FIG. 4, the light source unit 100, in this embodiment, comprises the LED module 140 which comprises a plurality of LED light sources 144 of different wavelengths, integrated with the control module 120 and the pulse control module 130. The light source module 140 comprises four LEDs 144 (144a to 144d) and respective LED drivers 142 (142a to 142d), each connected via a digital I/O interface to the controller 120. The controller 120 comprises a main processor 122, for switching the LEDs on and off and controlling operational parameters including on/off status, intensity, and other operational parameters. The LED controller 120 has an interface 124, i.e. comprising an IIC (Inter Integrated Circuit) interface with a two wire serial bus communications protocol to the pulse control module 130. The LED controller 120 also comprises an external interface 128 to the user interface 150, and a Digital I/O module 128 coupled to the LED drivers 142 of the LED module 140. The user interface 150 preferably includes a touch screen graphical user interface to facilitate user input of pulse parameters and control of the system. The LED controller 120 also preferably has an external USB interface which may be used to facilitate user input and control of the system. User inputs comprising pulse parameter information are converted by the controller, as will be described in detail below, to provide corresponding inputs (121), to the pulse control module, indicative of a pulse generation sequence.

The pulse control module 130 comprises processing means, in this example a processor 131 comprising an internal interface 136 to the controller 120 for receiving inputs from the controller, a timer 132 and a storage array 134 and digital outputs 138 to the LED module 140 for controlling pulse duration and relative phase. The digital outputs 138 provide digital control signals in the form of LED outputs, or LED on/off triggers, for controlling timing parameters such as pulse duration and relative phase for single pulse (single shot) or multiple pulses (pulse trains) of light of one or more wavelength from one or more LEDs. The digital outputs 138 may be coupled to inputs of the LED drivers via link/connection 141.

Optionally external apparatus 160 comprising a peripheral device 164, and a respective driver 162, may also be coupled to the digital outputs 138 of the pulse control module 130. The external device may, for example, be a detector, such as the CCD camera 160, shown in FIG. 3. That is, the digital outputs 138 of the pulse controller module 130 may also be coupled, via link/connection 161, to provide digital control signals (i.e. trigger signals) to the external device or devices 160, e.g. an external trigger and synchronization for operation of external device(s) 160.

The pulse control module 130 acts as a relational pulse controller and comprises a dedicated high-speed processor 131 that runs a program of LED on/off signals, to control the LEDs, and trigger signals, for controlling peripheral devices. All LED on/off signals and trigger signals are timed with respect to a single or common time reference.

The pulse control module 130 in this embodiment comprises processor 131, with a countdown timer 132 which runs when the pulse controller is turned on to execute the program. The data storage arrays 134 hold program information, which is received from the controller 120 via the internal interface 136. The digital outputs 138 are coupled to the LED module 140 (via link 141) and optionally to one or more external devices 160 (via link 161).

The pulse control module 130 receives inputs 121 indicative of a pulse generation sequence and runs a program generating digital control outputs for each channel, i.e. LED outputs, or trigger outputs, that are timed relative to a common timing reference. Thus, single pulses or multiple pulse trains may be independently controlled for each channel, while the common timing reference allows for precise control of the relative timing and relative phase of pulses or events on two or more channels.

In operation, the pulse control module 130 receives a series of events that are time unit based. During set up, user inputs to define pulse parameters are received and stored to define inputs indicative of a pulse generation sequence 121 for each channel, e.g., to define delay time, on time, off time for each LED light pulse and a sync.out timing defining an advance or delay time for an associated external trigger. Also defined is the minimum time interval for each channel. User inputs may also include information relating to external triggering options, or to select common triggering options for two or more channels. The user inputs are converted by the controller 120 to inputs indicative of a pulse generation sequence in the form of a simple program of instructions of on/off intervals as illustrated, for example, in the schematics shown in FIGS. 5 and 6, for execution of the method steps shown in the flow chart shown in FIG. 7.

The program controlling the digital outputs 138 is preferably stored as an array of a series of time units, based on the minimum time interval or increment, and a corresponding array of respective port outputs values for each channel at each time interval.

The time base is derived from a timed interrupt of the smallest time increment required by the specifications, for example 10 μs. Thus, when the smallest time increment is 10 μs, the time base is incremented 100 units to make 1 ms, or 1000 units for one second.

The selected time base for a program may be seconds, milliseconds or microseconds, for example, depending on the experimental requirements. Conveniently, digital outputs for all eight channels are all placed on one port for simultaneous transitions. All time bases are continuously monitored, and at the end of the interrupt, the output port values are combined into one output.

Figure 5:
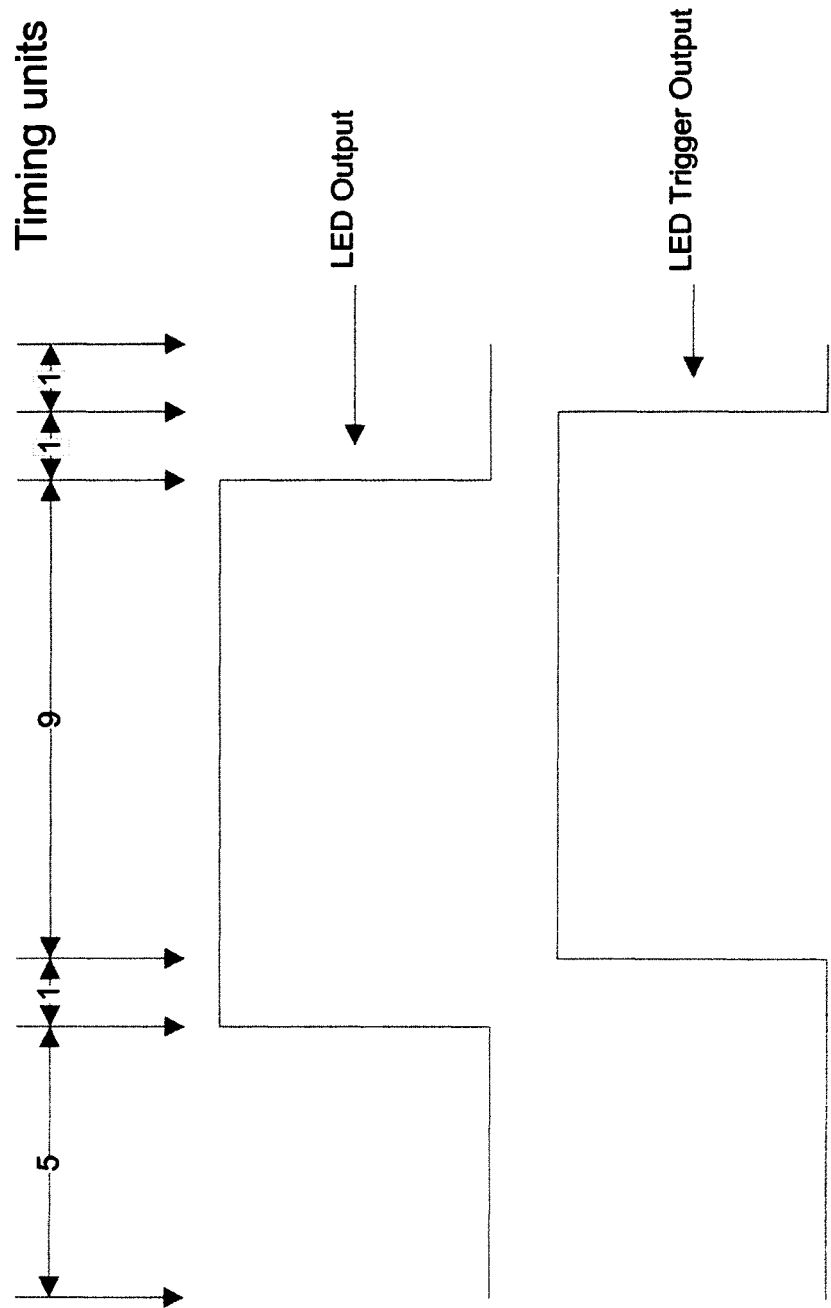
FIG. 5 shows an example of schematic timing diagram for the timing outputs (timing units) and respective control bits for two channels, providing a pair of digital control signals, i.e. one for an LED output and one for an associated trigger output.

A simple example of how this works is shown in FIG. 5, which illustrates the timing unit sequence and the LED (control) output and trigger (synchronization) output for one LED output and trigger output pair (i.e. two control channels).

In such an example, the pulse control module executes a program as follows (Note: bit 1 is the trigger output, bit 5 is the LED output):

1. A time of 5 is given, until the first time unit expires, it writes the digital output port value. In this case 0x00.
2. When time of 5 is expired, a value of 1 in this example is loaded into the time count down timer.
3. The value of 0x10 is loaded into the output port until the next count down timer is expired.
4. When the count down timer is expired, a value of 9 is loaded into the time count down timer.
5. The value of 0x11 is loaded into the output port until the next count down timer is expired.
6. When the count down timer is expired, a value of 1 is loaded into the time count down timer.
7. The value of 0x01 is loaded into the output port until the next count down timer is expired.
8. When the count down timer is expired, a value of 1 is loaded into the count down timer.
9. The value of 0x00 is loaded into the output port until the cycle is completed. The program loads one back into the count down timer and start back at step #1.
10. If the program is to repeat, it goes back to step 1.

The output sequence array is:
Times: 5,1,9,1,1
Port Output: 0x00, 0x10, 0x11, 0x01, 0x00

A length counter of 5 is automatically determined, i.e. from the length of the array.

Operation proceeds as follows:

1. The operator programs in the timing sequence using the user interface (Touch Screen 150) as shown in the screen capture, FIG. 8, for example, to input the delay time, on time, off time and sync.out timing for each LED and trigger channel pair. The operator may alternatively input the delay time, on time, off time and sync.out timing for each LED and trigger pair via a command line interface.
2. User inputs are received by the main processor 124 of the main controller board 120 via the external interface 128 and are processed by the controller 120 to generate the pulse control program, that defines transition events for each channel (e.g. LED on, LED off, and trigger on, trigger off events and the relative timing of transition events on each channel, referenced to a common timing reference. The program may include a time output array, and a port output array, and any other parameters, that define the timing of transition events on any channel, and corresponding output port values for each channel for each of the transition events.
3. When the program is to be started, the main processor 124 on the main controller board 120 sends the program via the internal interface 122 to the pulse control module 130.
4. The main processor 120 on the main controller board sets the digital I/O to the LED drivers to turn on and off the LEDs as per the digital outputs 138 of the internal pulse control module.
5. The program is received into the pulse control module via the internal interface 136.

When the LED driver 142 receives a '1' or on, it turns on the corresponding LED. When the LED driver receives a '0' or off, it turns off the corresponding LED.

The execution sequence is programmatically controlled which means that the pulse train is not limited to alternating between output pins; it allows one pin to be toggled multiple times before another pin is toggled once. This allows the program to control numerous digital outputs (channels) to an accurate time with a minimum amount of hardware. The outputs are all consistently timed with respect to each other by the same program. Thus, every LED output and trigger output can be timed with respect to each other.

Figure 6:
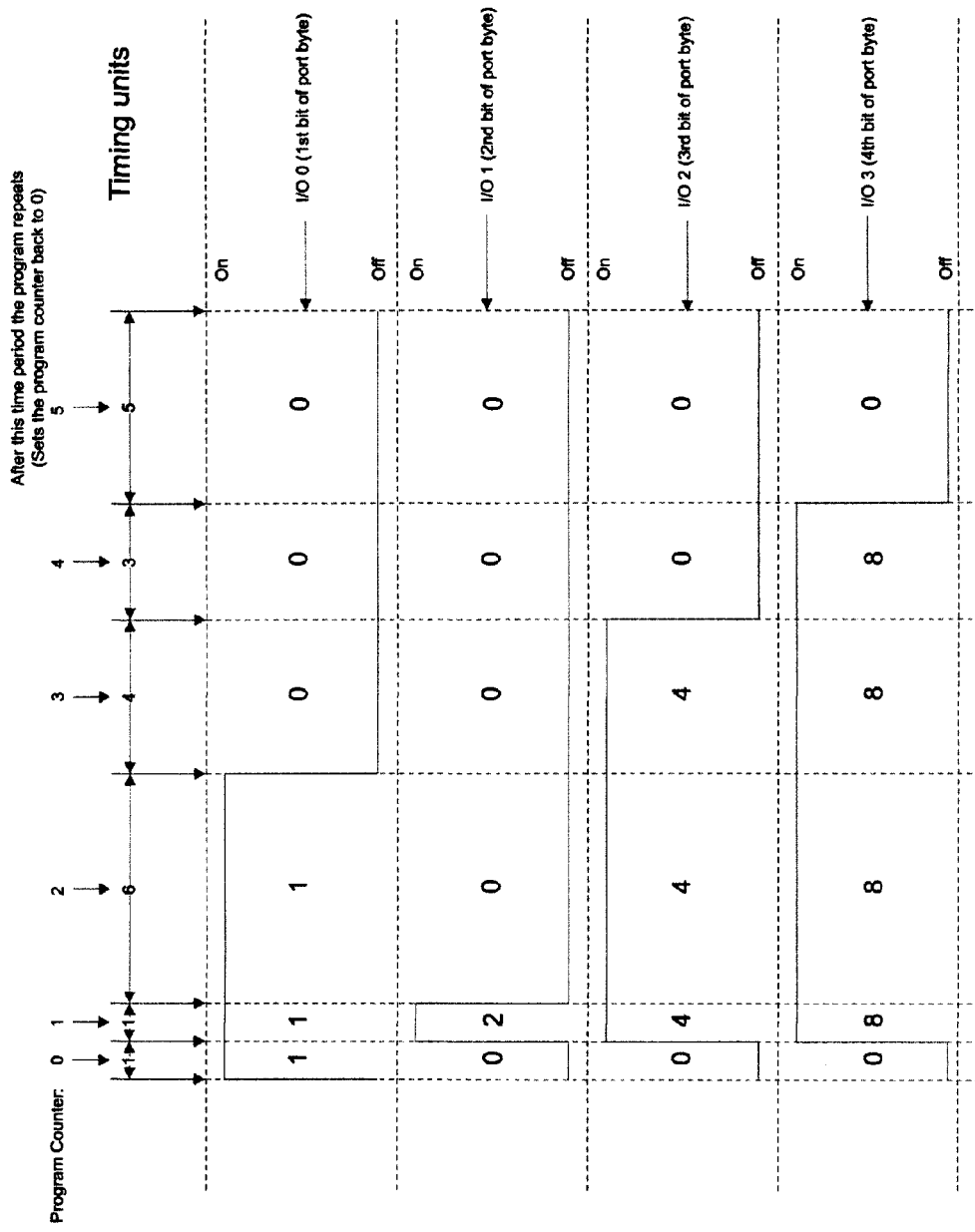
FIG. 6 shows another example of a schematic timing diagram for the timing outputs (timing units) and respective control bits for a plurality of 4 channels for LED outputs and/or trigger outputs.

As illustrated, for example, in FIG. 6, which shows an example for four LED channels, this highly variable time adjustment combines with the ability to control, for example four LEDs and four external trigger controls, with respect to each other, such as illustrated in the embodiment shown in FIG. 4. Thus, experiments may be more precisely controlled, and may be controlled completely from the light source. Control of separate digital output lines can be provided at a high rate.

The programming can be executed quickly and with little overhead. For example, instead of requiring external pulse generators for each channel, which could take up 6 to 8 square feet of bench space, the pulse control module or unit comprises a single processor chip or other digital processor such as a FPGA, CPLD, or ASIC, which can be integrated within the LED control unit. In addition to controlling individual LEDs, the pulse control module provides for triggering and synchronization with external devices, such as, cameras and other microscopy peripherals, radiometers, and image processing devices. This results in a lower cost unit that is scalable without affecting the ability to keep the timing correct.

In other alternative embodiments, a light source unit 100 such as illustrated in FIG. 4, may control other light source units, 100, in a cascading arrangement, if required. For example, the trigger signal from 161 may connect directly to LED drivers 142 on another LED system.

The embodiment described with reference to FIG. 4 uses a simple processor to control 8 channels, e.g. 4 LEDs of different wavelengths and 4 external triggers. In alternative embodiments, the system may be expanded with a larger processor if needed, to control 8, 16 or 32 channels, for example. Outputs for all channels may be grouped on one port, for example, if there are 8 or less outputs. Alternatively, outputs may be placed on more than one port, if there are a larger number of channels, or as required.

Conveniently, the light source unit 100 includes an integrated user interface, so that the user/operator has a large touch screen user interface to facilitate control, simply by selecting or setting a few parameters to define light pulses, e.g. delay, on and off times, and for setting a trigger advance or delay (sync. out timing). Alternatively, in other embodiments (not shown), the system may be interfaced to and programmed through a standard personal computer with a keyboard and graphical user interface or other suitable user interface.

FIGS. 8, 9, 10 and 11 show examples of screen shots from the touch screen user interface for setting up an experiment using 4 different wavelength LED light sources with emission bands at 460 nm, 385 nm 525 nm and 635 nm. Each LED channel has an associated trigger channel. The first screen (FIG. 8) shows a trigger set up screen indicating values selected for each of a delay time, on time, off time and sync.out timing for each LED channel. For example, for the 385 nm LED channel, selections indicate a delay time of 1 ms, on time of 2 ms and off time of 3 ms and a sync. out timing of the associated trigger channel of −1 ms, i.e. advanced by 1 ms. Similarly for the 460=LED channel 20 μs has been selected for each of the delay time, on time and off time, and a "sync.out" timing for the trigger channel is delayed by 10 µs. The repeat loop is selected to be "on" to enable the pulse sequences to be repeated continuously. Selection of an "Ext" trigger option provides for the respective channel or channels to be tied to an external trigger source. Selection of a "Global" trigger option provides for multiple channels to be tied to a common internal or external trigger.

Figure 7:
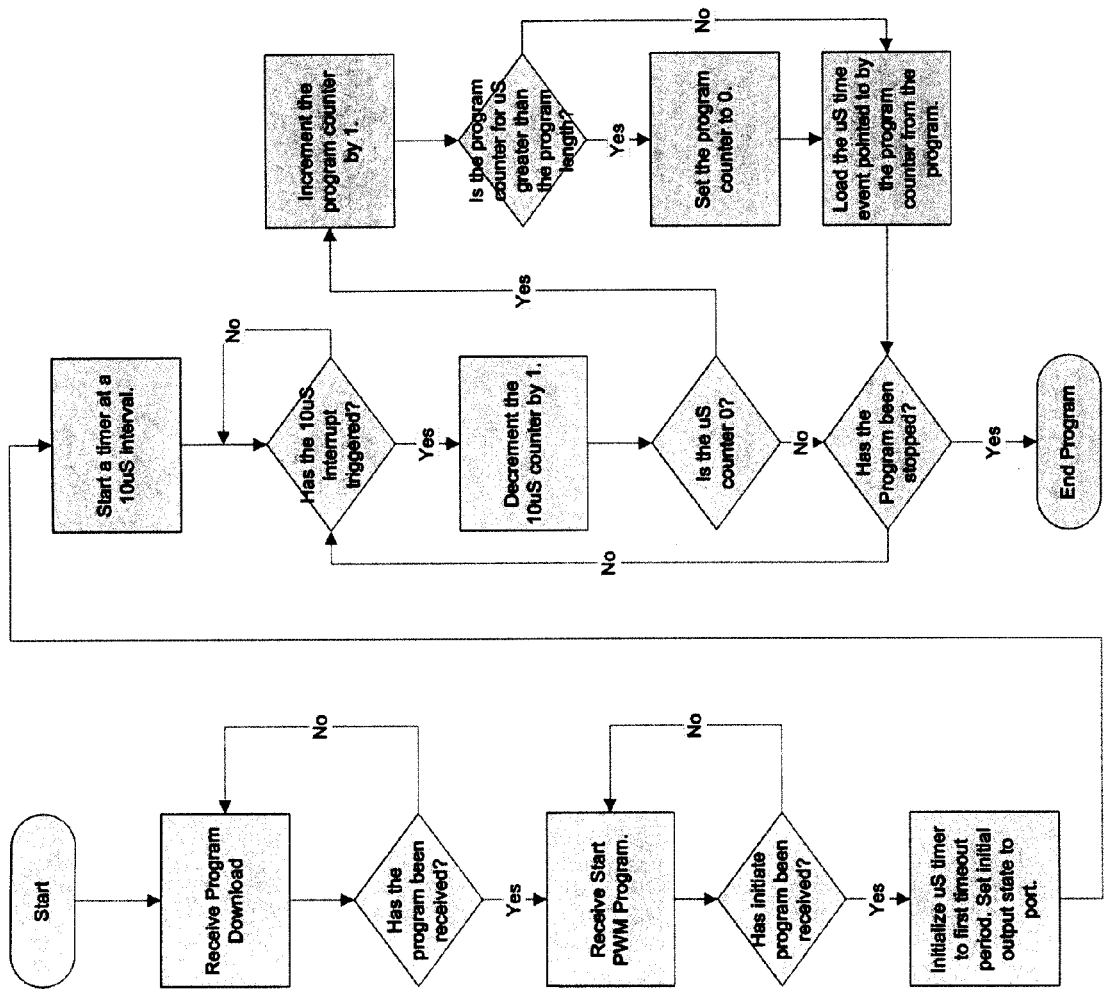
FIG. 7 shows a flow chart illustrating steps of the method for generating digital outputs for controlling the inputs indicative of a pulse generation sequence for respective channels for each LED output and external trigger output.

During set up, user inputs are received, stored, and converted to a simple program of instructions of on/off intervals, which are executed, for example, as illustrated in the flowchart shown in FIG. 7, and provides, in this example, for timing intervals in the µs, ms and s ranges, with a minimum timing interval of 10 µs.

Figure 9:
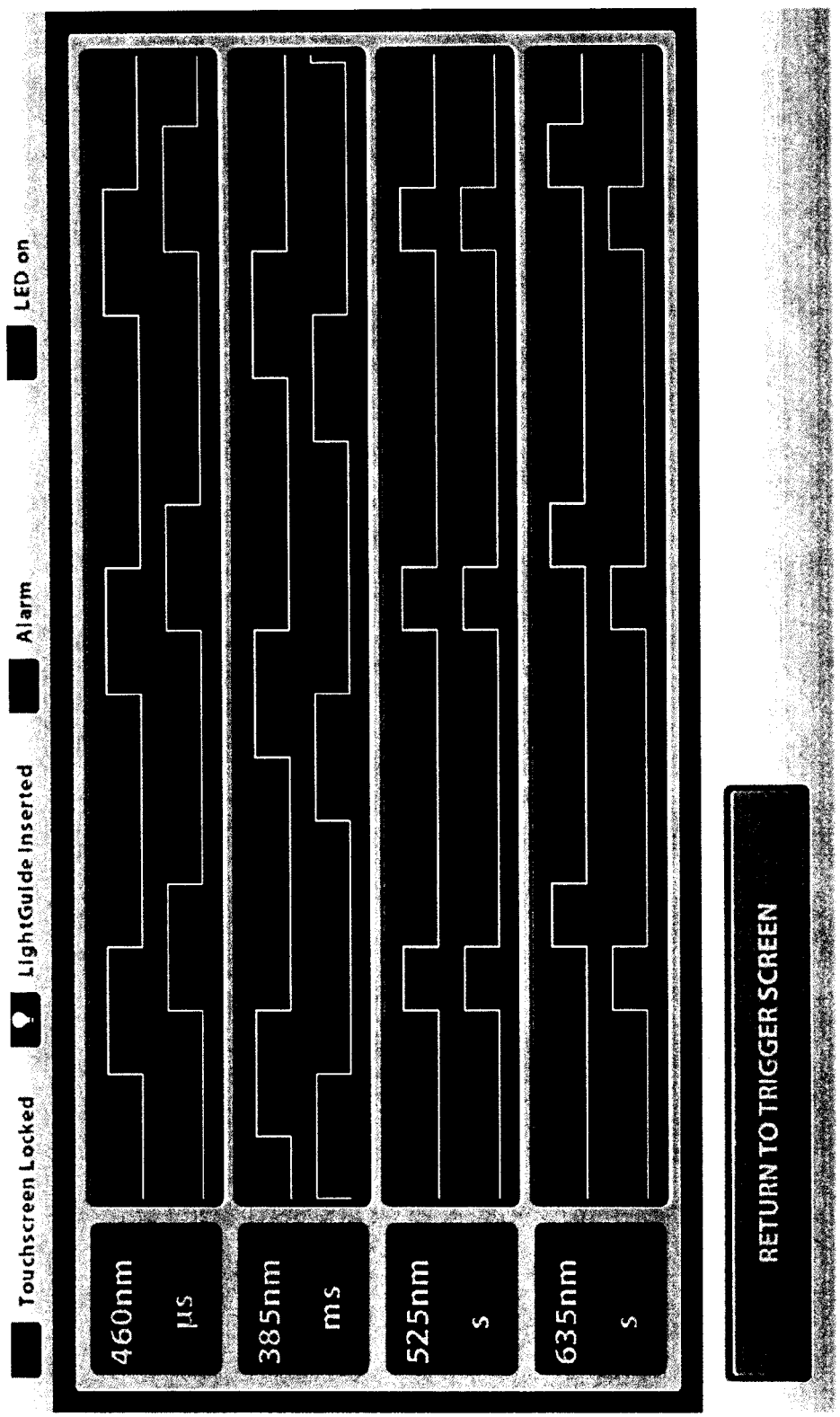
Figure 10:
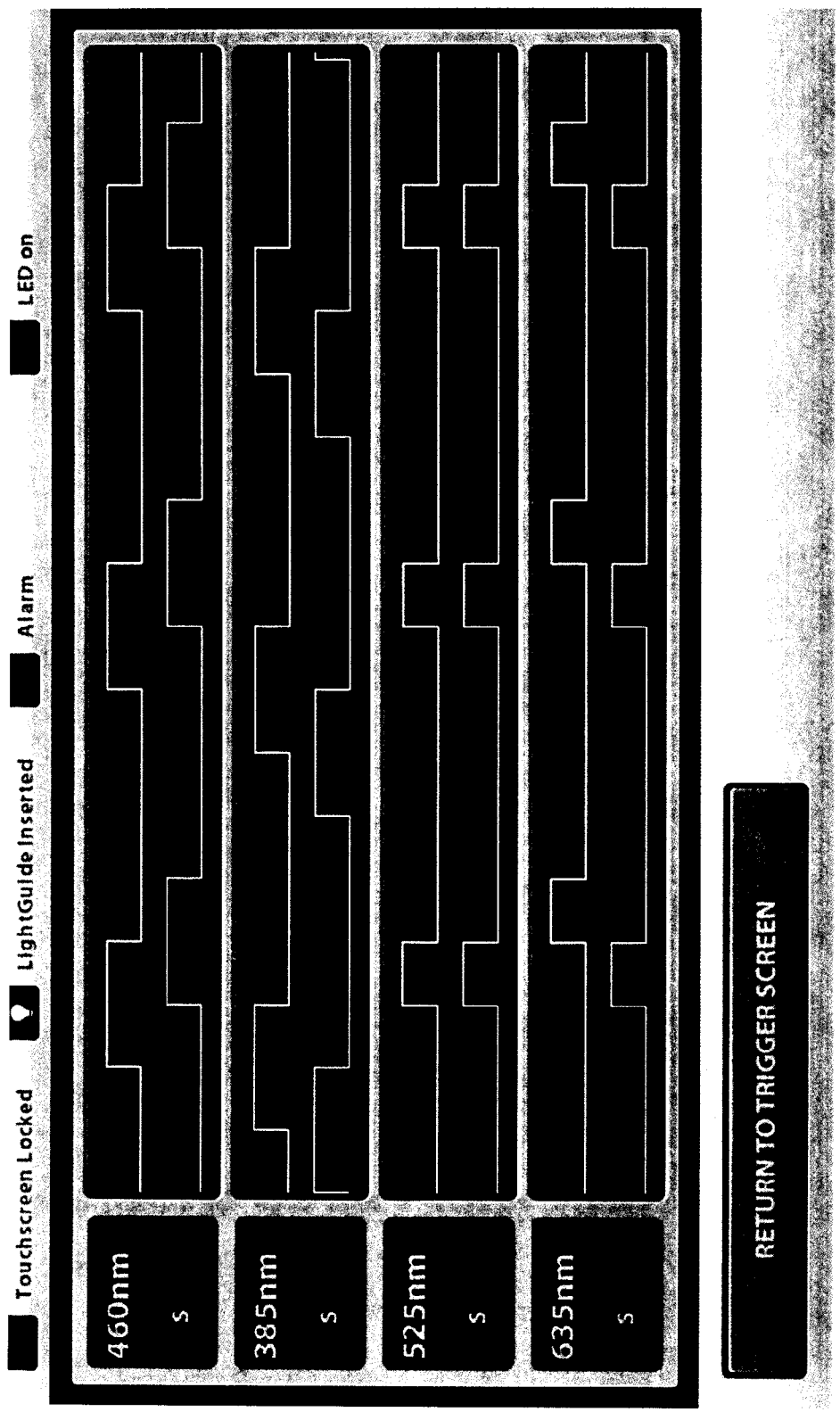
Figure 11:
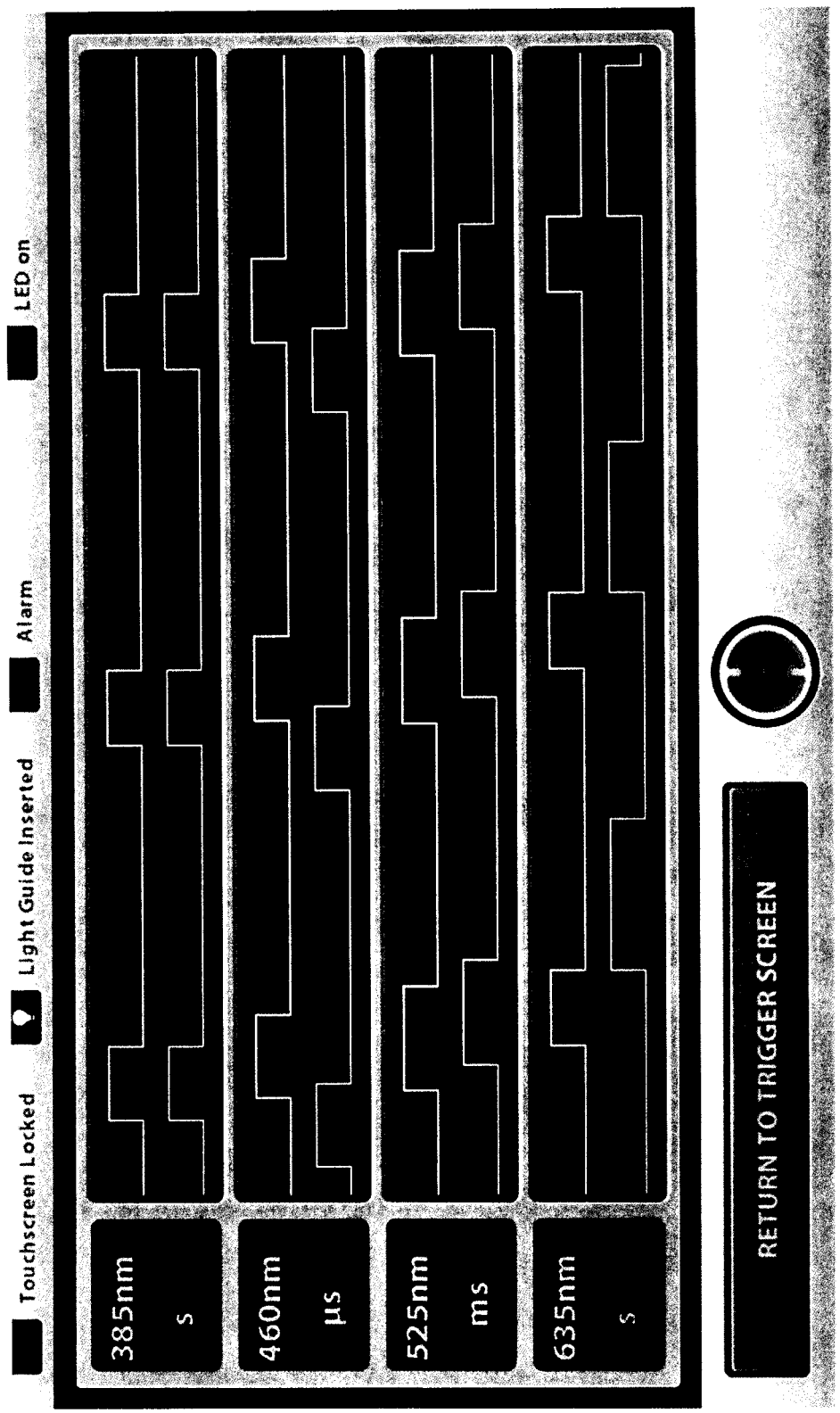

For example, as illustrated in screen shot of the LED screen shown in FIG. 9, pairs of pulse traces are shown for each of the four LEDs indicating the LED output on/off cycles (upper trace of each pair) and the corresponding external trigger or synchronization pulses (lower trace of each pair). Thus, the control program provides digital outputs for 8 channels: 4 LED outputs and 4 LED external triggers. In this example, the time scale differs for each pair of LED/trigger channels. FIG. 10 shows similar screen shot for a different set of operating parameters having a similar pulse pattern but where each channel has the same time scale. FIG. 11 shows another LED screenshot for other pulse parameters.

Thus, the system may be easily programmed by user inputs indicating the time base unit, delay time, on time, off time and sync.out time for each channel, together with other options such as setting global (common) triggering or individual, internal or external triggering on each channel. The external triggers outputs may be used for monitoring equipment, such as a radiometer, a camera/detector, or other external equipment such as a sample injector, image processing, or other peripherals, for example.

In the particular embodiment described above, the pulse controller executes a program to set up to 8 digital outputs in a coordinated sequence. For a set of 4 LEDs and 4 trigger channels, for example, 24 events may be coded per time base per cycle. The number of events is limited by the memory in processor and a larger processor and memory would enable a larger number of events. The system allows each channel to be individually configured as internally or externally triggered on a per LED basis. Thus, applications can be supported where there is no known relationship between some of the inputs. For example, two channels may be running from triggers that are generated on the pulse control module 130 internally but where an asynchronous event is controlling the other LEDs.

Figure 8:
FIGS. 8, 9, 10 and 11 show schematic diagrams illustrating screen shots of the touch screen graphical user interface for the control system.

All input triggers may be tied together, i.e. a common input trigger is indicated as "Global" in FIG. 8. This reduces the number of cable inputs required if the LEDs are always to be triggered at the same time. This option may be selected by a software setting and it can be deactivated for any channel, thus allowing the isolated channel to operate in a separate trigger domain, if necessary.

The unit 100 allows for each LED signal to drive an associated trigger output that can be used to synchronize external equipment, with an advanced or delayed signal. When such signals are generated internally (i.e. within the light source unit) there exists the possibility of "phasing" the trigger output. i.e. in a situation where a piece of external equipment takes a long time to initialize before being ready to use, it is possible to sequence its startup prior to the LED being activated by using the LED pulse information and "looking ahead" a predetermined time in the sequence.

The system is capable of doing this on a per-LED basis, so there are four such outputs that can either be advanced or retarded in time to suit. Even in repetitive pulse trains, the advance and retard time is not limited to a single cycle. The implementation as described above with reference to FIGS. 8 to 10, actually has eight individual channels, but ties four channels to the LEDs and four to the trigger outputs. Each LED channel is paired with a trigger output channel and the trigger output may be a time advanced or retarded version of the LED pulse train. Alternatively, the LED-trigger pairing may be broken, releasing the trigger from echoing the LED pulse train. This allows the unit to behave as though it had four separate, programmable TTL-level pulse generators that could be used to either drive equipment in another part of the experiment or for a completely isolated experiment entirely. In the same vein, since the pulse train is established in memory as a series of transition events, there exists the possibility that each LED could be configured to have an arbitrary pulse sequence assigned to it.

The ability to establish different trigger domains and different pulse sequences over very long time periods means that much of the sequencing complexity that is currently executed in high-level software applications is migrated down to a single-purpose piece of hardware. With PC application software being vulnerable to issues, such as, timing instability, security problems, operating system stability, for example, the migration of this sequencing to the hardware aids in the experimental resiliency of the setup.

The pulse control module of the system allows for each LED to operate independently with regard to the sourcing of the signal pulse. In so much as the LED can be set to pulse from its own internal generator, it can also be individually set to use an external source.

Channels may be individually configured as internally- or externally-triggered on a per-LED basis. This provides the advantage of being able to support applications where there is no known relationship between some of the inputs. For example, two of the channels may be running from triggers that are generated on the pulse controller internally, while an asynchronous event is controlling other LEDs. The user interface may, for example, offer options to select internal or external triggers, a global trigger (where a single external source is tied to all selected channels), or trigger off.

The system may provide the following features:
The pulse control executes a program to set up a specified number, e.g. 8 digital outputs in a coordinated sequence.
The pulses for each channel can be timed with respect to each other, to enable the relative timing and phase of a sequence of events on two or more channels to be controlled.
The pulse trains for each channel are independent of each other; the channels do not have to run in a particular order, sequence or pattern to generate the desired pulse train. For example channel 1 does not have to be on before channel 2 may come on.
User inputs, on the touch screen 150, or other suitable user interface, may be stored by the controller 120, and then the pulse profiles are downloaded into the pulse control module 130 when initiating the pulse control program.

In the embodiments described above and illustrated in FIGS. 3 and 4, the pulse controller 130 comprises a pulse control module 130 including a processor, which is integrated within the light source unit 100. However, in alternative embodiments the pulse controller hardware may be a separate unit, or integrated with other components of the light source unit.

A processor as described above, a state machine, a FPGA (Field Programmable Gate Array) or CPLD (Complex Programmable Logic Device) chip or an ASIC (Application Specific Integrated Circuit) can be used, for example, to implement the steps of the pulse control method.

The timing sequence may span several time domains, e.g. three, time domains, which may be µs, ms and s, for example. Other implementations may include ns, minutes or hours, if required.

Figure 12:
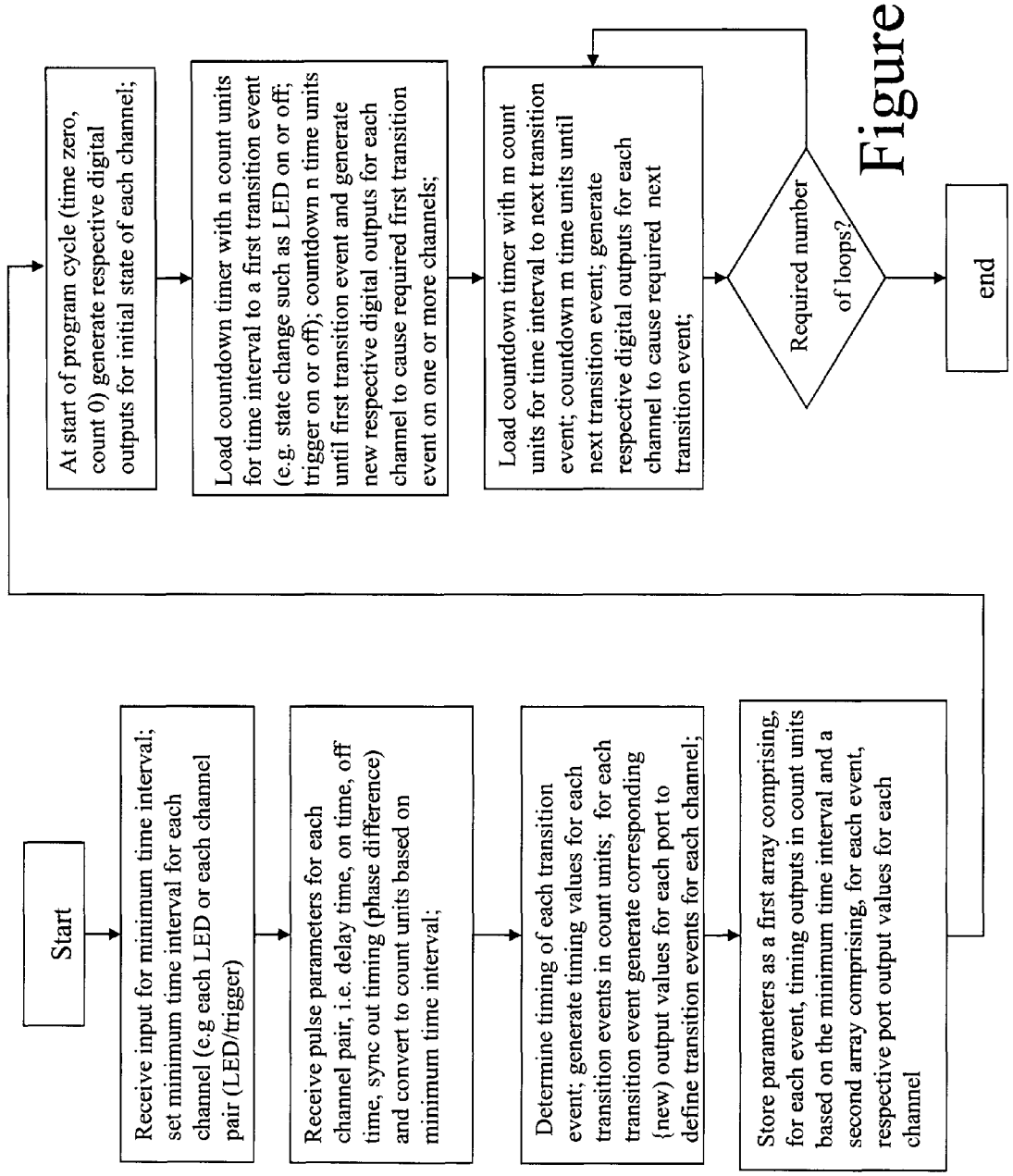
FIG. 12 shows a flow chart illustrating method steps (high level steps carried out by the system) for generating digital control signals controlling LED lights sources for fluorescence microscopy.

Steps of a method according to an embodiment similar to that described above are illustrated in the flow chart in FIG. 12. After the inputs are received, i.e. user inputs to define the minimum time unit, the delay time, on time, off time and sync. advance or delay time, for each channel, the user inputs are used to generate a time unit array and an LED/trigger output array. Other inputs may be received to define other parameters, for example, whether to use a single cycle, or a repeat loop. As represented in FIG. 4, these data are used to generate inputs 121 to the pulse control module. The inputs 121 indicative of a pulse generation sequence are sent to the pulse control module 130, in the form of data arrays i.e. a time unit array and a port output array, and associated values. On receiving an instruction to initiate the program, inputs 121 are received and stored by the processor of the pulse control module 130, i.e. stored as arrays holding program information 134 as described above, i.e., a time array and a port output array. The program provides some means of linking the two arrays, e.g. a pointer. When the Start pulse control program command is received, the timers 132 for each time range are initiated and an initial output state is set to the port. The timer is started at a the smallest selected time interval, e.g. 10 µs and when the 10 µs interrupt triggers, the 10 µs counter is decremented by 1 until the µs counter is at zero, when the program counter is incremented by 1, and the next µs time event is loaded from the program. If the 10 µs counter is not yet at zero, the ms counter decrements the ms counter by 1 every 100 10 µs units, until the ms counter reaches zero, and similarly the program counter is then incremented by 1 and the next ms time event is loaded from the program. A similar sequence is performed for the second timing interval. Then the output port is set using the current program counter until the program has been completed for µs, ms and s time ranges, as required In alternative embodiments, execution of the timed sequence of LED and trigger control signals can be accomplished in several other ways. It is not limited to the specific hardware and software implementation described above. In alternative embodiments, the pulse controller and program implementation may comprise for example:

a. A FIFO buffer and a linked list to increment through the times and digital I/O output information.
b. A multi-threaded application could use one common pointer variable, one thread to increment the pointer variable based on the time. The other thread could use the current pointer variable to write out to the digital I/O port.
c. A stack can also be used to go through the number arrays to execute the sequence. This removes the requirement for the pointer variable.

Advantageously, preferred embodiments, as described above, use a single timer, to provide a single common reference time for all channels, e.g. based on a 10 µs counter. Thus, control signals for each channel may be phase aligned with respect to a time zero, or a desired reference time. The relative timing and phase of events on each channel may be controlled independently, while all are based on a common timing reference for all channels.

The pulse width can be adjusted with a granularity that is related to the smallest count of 1 versus the number of discernible combinations for a counter of n bits, i.e. $1/(2^n)$ For example, a 16 bit counter, allows for adjustments in time increments of $1/(2^{16})$ or 0.0015%. This provides a significant advantage over conventional PWM based pulse controllers for LEDs which typically allow for 12 settings or 100 settings, and thus allows for increments of 3.5%, or 1% respectively.

To reduce the processing requirements, preferably, the method of storing time events, for example, using arrays as described above, minimizes the number of memory reads to those absolutely required. That is the memory is read for each transition event, rather than for each time unit. This approach also means that memory accesses will not occur faster than the smallest time interval.

While it is envisaged that alternative embodiments, particularly those controlling a larger number of channels, may comprise multiple timers, each associated with individual channels or groups of channels, to provide a common timing reference, timers would be need to be referenced to a common master clock or timer to allow for phase alignment of channels controlled by different timers, thus adding to the complexity of the system.

Conveniently, the method provides for parallel addressing of all LED sources and trigger channels on single port, e.g. for up to 8 channels. Multiple port implementations may be used as appropriate, or if required for implementation requiring a larger number of channels.

While preferred embodiments described above provide a pulse controller using a time based sequence of control signals, in alternative embodiments, other implementations of the method may be used, for example, using a programmable pulse generator utilizing a fixed time reference.

Although specific embodiments are described in detail above for controlling pairs of channels for an LED and associated trigger output, it will be appreciated that a pulse generation system according to alternative embodiments may comprise a pulse controller module 130 that provides for independently controlling a plurality of pulse output channels for other configurations of LEDs and/or other devices. For example, the pulse controller may control a plurality of LEDs only, or control one or more LEDs and a plurality of peripheral devices. One example may be a pulse controller implemented as an external device for providing a control outputs for time control of an LED, then an autofocus unit and then subsequently a camera. As mentioned above, two or more light source units may be cascaded, with one unit providing control outputs to another one.

The above description refers to light sources comprising one or more light emitting diodes emitting light in the ultraviolet, visible regions and/or infrared of the spectrum, particularly high intensity LEDs for use as excitation light sources for applications such as fluorescence microscopy, high resolution absorption spectroscopy, and other optical spectroscopic measurements, for example. The pulse controller is particular applicable for measurements requiring precise control of timing and phase of multiple light pulses of different wavelengths, and/or synchronization with other equipment, for quantitative as well as qualitative analysis.

It will be appreciated that the pulse controller according to embodiments of the present invention may also be applicable for control of other suitable types of solid state or semiconductor light emitting devices, including laser diodes, for example. For some wavelengths, semiconductor light emitting devices may be used in combination with phosphors or wavelength conversion elements.

INDUSTRIAL APPLICABILITY

LED light sources, pulse controllers, pulse control modules, and methods, according to embodiments of the invention find particular application to controlling illumination comprising single and multiple pulse trains where improved control of relative timing of several events is required, such as for control of multiple LEDs of different wavelengths for fluorescence microscopy or other spectroscopic analysis and/or synchronization and control of peripheral devices.

Embodiments of the invention provide a high performance pulse controller, preferably as a module that may be internally integrated in an LED light source and allows for advanced phase and frequency synthesis with fine-grain duty cycle adjustment over multiple independent clock domains reducing dependence on external equipment and bench clutter. Preferably, an easy-to-use Graphical User Interface (GUI) module provides full control over the system and permits viewing of LED and system status, monitors and LED parameters. A virtual-oscilloscope feature plots all channel waveforms, providing visualization of LED outputs and trigger outputs over time, and potentially reducing the need for external electrical or optical test equipment.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. An LED (Light Emitting Device) light source comprising:
   an LED light source means comprising one or more LEDs and respective LED drivers, a control means, and a pulse controller means for controlling pulse generation, wherein:
   the pulse controller means comprising processor means for receiving inputs indicative of a pulse generation sequence and generating control signals for each of a plurality of devices comprising the one or more LEDs and other peripheral devices, and for independently controlling, with respect to a common timing reference, timing and relative phase of pulsed operation of the one or more LEDs and/or one or more other devices.

2. An LED light source according to claim 1 wherein:
   the processor means is operable to execute a time based sequence of control signals comprising digital outputs for independently controlling timing and relative phase of a change in operational state of one or more of the plurality of devices, said digital outputs comprising, for each of the plurality of devices, a respective LED output or trigger output.

3. An LED light source according to claim 2 wherein for each change in operational state, said digital outputs comprise one or more of LED on, LED off, trigger on and trigger off outputs.

4. An LED light source according to claim 1 wherein the processor means further comprises:
   interface means for receiving from the control means inputs indicative of a pulse generation sequence defining transition events associated with a change of operational state for one or more of the plurality of devices, said inputs comprising the timing of each transition event with respect to the common timing reference, and for each transition event, the corresponding operational state for each device;
   data storage means for storing the inputs indicative of a pulse generation sequence;
   timer means for timing of transition events with respect to the common timing reference; and
   digital output means for generating a timed based sequence of said control signals comprising digital outputs for each transition event.

5. An LED light source according to claim 4 wherein for each transition event, digital outputs comprise one or more of LED on, LED off, trigger on and trigger off outputs for controlling the operational state of each of the plurality of devices.

6. An LED light source according to claim 4, wherein
   the timer means defines the common reference timing for the plurality of devices and further comprises counter means for counting time units; and
   the storage means stores said inputs indicative of a pulse generation sequence for the time based sequence comprising:
   timing values in timing units, relative to said common reference timing, for each transition event; and
   corresponding port output values for setting the operational state of each of said plurality of devices at each transition event;
   the processor means being operable from the time based sequence to set initial output port values and to run the counter means to count timing units to a transition event, retrieve corresponding output port values, and provide corresponding digital outputs comprising port output values for each device for each transition event.

7. An LED light source according to claim 6 wherein the inputs indicative of a pulse generation sequence further comprise: a minimum time interval for transition events for each device; and wherein the timing of each transition event is defined in count units based on the minimum time interval.

8. An LED light source according to claim 6 wherein the counter means comprises counters for counting output time values for one or more time scales, at least one time scale corresponding to a minimum required time interval for operation of the plurality of devices.

9. An LED light source according to claim 6 wherein the counter means provides for counting time units to each transition event for at least one time scale selected from the group consisting of nanoseconds, microseconds, milliseconds, and seconds.

10. An LED light source according to claim 6 wherein the time based sequence provides for independent control of the timing and relative phase of pulsed operation for each individual device, for one or more pairs of devices, for one or more groups of devices, or provides for common triggering of all devices.

11. An LED light source according to claim 4 wherein the digital output means provides outputs for at least one of:
    a) a pair of channels providing an LED output and a trigger output respectively, for controlling pulse generation and synchronization of an LED and another device; or
    b) a plurality of channels comprising LED outputs for controlling pulse generation and synchronization of a corresponding plurality of LEDs; or
    c) a plurality of channels comprising a plurality of LED outputs and at least one trigger output for controlling pulse generation and synchronization of a plurality of LEDs and at least one other device; or
    d) a plurality of channel pairs, each pair comprising an LED output and an associated trigger output for controlling the timing and relative phase of operation of a peripheral device.

12. An LED light source according to claim 4 wherein the LED light source means comprises a set of LEDs and respective individual LED drivers, and wherein the digital output means provides outputs for four channels comprising the four LED outputs and for four other channels comprising trigger outputs for other peripheral devices, and wherein each LED output may optionally be paired with an associated trigger output.

13. An LED light source according to claim 1 wherein the control means further comprises input means for:
   a) receiving pulse parameters for each of a plurality of channels associated with a respective LED or other device;
   b) generating from received pulse parameters: a timing of each transition event, associated with a change of operational state of an LED or other device, in count units based on a minimum time interval for all channels; and, for each transition event the corresponding operational state of each LED or other device; and
   c) generating inputs indicative of a pulse generation sequence comprising: timing, in count units, of each transition event and corresponding output port values for each channel for implementation of the transition events.

14. An LED light source according to claim 1 wherein the pulse controller means comprises a pulse controller module coupled via interface means to the control means and integrated within a unit of the LED light source.

15. An LED light source according to claim 14 wherein the digital outputs of the pulse control module are coupled to respective inputs of drivers of the one or more LEDs, and to external trigger outputs for one or more other devices.

16. An LED light source according to claim 1 wherein the processor means comprises one of a processor, a FPGA, a CPLD, ASIC chip, and other digital device or circuit, for programmatically executing the time based sequence of digital control signals from received inputs indicative of a pulse generation sequence.

17. An LED light source according to claim 1 wherein each LED comprises any one of a light emitting diode, a laser diode, an electroluminescent light emitting device, a superluminescent diode, or other solid state light emitting device or semiconductor light emitting device.

18. A method for controlling operation of an LED light source comprising one or more LEDs and respective LED drivers, a control means and a pulse controller means for controlling pulse generation, the method comprising:
   receiving, from input means, inputs indicative of a pulse generation sequence for each of a plurality of devices comprising the one or more LEDs and optionally, for one or more other devices, and
   generating, in the pulse controller means, digital control signals for each of a plurality of channels, each associated with a respective one of said one or more LEDs and one or more peripheral devices,
   said digital control signals independently controlling, with respect to a common timing reference, timing and relative phase of pulsed operation of the plurality of devices comprising one or more LEDs and one or more other devices.

19. A method according to claim 18 comprising receiving inputs indicative of a pulse generation sequence comprising parameters defining transition events associated with a change of operational state for one or more of the plurality of devices, and further comprising:
   storing parameters defining a time based sequence comprising the timing of each transition event with respect to the common timing reference, and for each transition event, corresponding digital port output values for each channel; and
   wherein the method further comprises executing the time based sequence by steps comprising:
   setting initial port output values for each channel; and
   for each transition event, counting, in timing units with respect to the common timing reference, a time to the transition event; and
   retrieving digital port output values for the transition event and generating corresponding digital outputs for each channel.

20. A method according claim 19 further comprising receiving and storing a minimum time interval for transition events for each channel; and wherein counting the timing of each transition event comprises counting in count units based on the minimum time interval.

21. A method according to claim 19 wherein counting comprises counting output time values for one or more time scales, at least one time scale corresponding to a minimum required time interval for operation of the plurality of devices, and for at least one time scale selected from the group consisting of nanoseconds, microseconds, milliseconds, and seconds.

22. A method according to claim 19 wherein generating digital outputs comprises generating port output values for transition events for at least one of:
   a) a pair of channels providing an LED output and a trigger output respectively, for controlling pulse generation and synchronization of an LED and another device; or
   b) a plurality of channels comprising LED outputs for controlling pulse generation and synchronization of a corresponding plurality of LEDs; or
   c) a plurality of channels comprising a plurality of LED outputs and at least one trigger output for controlling pulse generation and synchronization of a plurality of LEDs and at least one other peripheral device; or
   d) a plurality of channel pairs, each pair comprising an LED output and an associated trigger output for controlling the timing and relative phase of operation of a peripheral device.

23. A method according to claim 18 further comprising:
   generating from input pulse parameters a time based sequence of control signals comprising digital outputs for each channel for independently controlling timing and relative phase of a change in operational state of one or more of the plurality of devices, said digital outputs comprising, a respective LED output or trigger output.

24. A pulse controller for an LED (Light Emitting Device) light source comprising processor means for receiving inputs indicative of a pulse generation sequence and generating control signals for each of a plurality of channels for independently controlling, with respect to a common timing reference, timing and relative phase of pulsed operation of a plurality of devices comprising one or more LEDs and one or more other devices.

25. A pulse controller for an LED light source according to claim 24 wherein the processor means further comprises:
   interface means for receiving from a control means of the LED light source inputs indicative of a pulse generation sequence comprising parameters defining timing of transition events associated with a change of state of respective LED outputs and other device trigger outputs for each channel;
   data storage means for storing said parameters;
   timer means for timing of transition events for each channel with respect to the common timing reference; and
   digital output means for generating a timed based sequence of said control signals comprising digital outputs for each channel for each transition event.

26. A pulse controller for an LED light source according to claim 25 wherein:
   the timer means defines the common reference timing for all device channels and comprises counter means for counting time units and;
   the storage means stores said parameters for the time based sequence comprising:
   timing values in timing units, relative to said common reference timing, for each transition event; and corresponding port output values for each channel for each transition event;
   the processor means being operable to set initial port output values and to run the counter means to count timing units to a transition event, retrieve corresponding output port values, and provide corresponding digital outputs comprising output port values for each channel.

27. A pulse controller for an LED light source according to claim 26 wherein parameters for the time based sequence further comprise a minimum time interval for transition events for each channel; and wherein the timing of each transition event is defined in count units based on the minimum time interval.

28. A pulse controller for an LED light source according to claim 27 wherein the counter means comprises counters for counting output time values for one or more time scales, at least one time scale corresponding to a minimum required time interval for operation of the plurality of devices.

29. A pulse controller for an LED light source according to claim 26 wherein the counter means provides for counting time units to each transition event for at least one time scale selected from the group consisting of nanoseconds, microseconds, milliseconds, and seconds.

30. A pulse controller for an LED light source according to claim 26 wherein the time based sequence provides for independent control of the timing and relative phase of pulsed operation for each individual channel, for one or more pairs of channels, for one or more groups of channels, or provides for common triggering of all channels.

31. A pulse controller for an LED light source according to claim 25 wherein the digital outputs means provides outputs for at least one of:
   a) a pair of channels providing an LED output and a trigger output respectively, for controlling pulse generation and synchronization of an LED and another device; or
   b) a plurality of channels comprising LED outputs for controlling pulse generation and synchronization of a corresponding plurality of LEDs; or
   c) a plurality of channels comprising a plurality of LED outputs and at least one trigger output for controlling pulse generation and synchronization of a plurality of LEDs and at least one other device; or
   d) a plurality of channel pairs comprising an LED output and an associated trigger output for controlling the timing and relative phase of operation of a peripheral device.

32. A pulse controller for an LED light source according to claim 24 wherein the pulse controller means comprises a pulse controller module for integration within a unit of the LED light source, and comprising interface means for coupling to a control means of the LED light source.

33. A pulse controller for an LED light source according to claim 32 wherein the processor means comprises one of a processor, an FPGA, a CPLD, an ASIC chip, and other digital processor device or circuit, for programmatically executing the time based sequence of digital control signals from received inputs indicative of a pulse generation sequence.

34. A pulse controller for an LED light source according to claim 24 wherein the processor means is operable to execute a time based sequence of control signals comprising digital outputs for independently controlling timing and relative phase of a change in operational state of one or more of the plurality of devices; said digital outputs comprising, for each channel, a respective LED output or trigger output.

35. A pulse controller for an LED light source according to claim 24 wherein for each change in operational state, said digital outputs comprise, for each channel, one or more of LED on, LED off, trigger on and trigger off outputs.

* * * * *